INVENTORS
ROBERT F.C. VESSOT
NORMAN F. RAMSEY
DANIEL KLEPPNER

BY *J.E. Rosenblum*
ATTORNEY

United States Patent Office 3,209,280
Patented Sept. 28, 1965

3,209,280
ATOM STORAGE CELL FOR ATOMIC
HYDROGEN MASER
Robert F. C. Vessot, Marblehead, and Norman F. Ramsey and Daniel Kleppner, Belmont, Mass., assignors to Varian Associates, Palo Alto, Calif., a corporation of California
Filed Sept. 24, 1962, Ser. No. 225,691
3 Claims. (Cl. 331—94)

The present invention relates in general to quantum resonance devices, and more particularly to a novel atom storage cell construction for an atomic hydrogen maser.

An atomic hydrogen maser, as disclosed by N. F. Ramsey and D. Kleppner in Physical Review Letters, 5, 361 (Oct. 15, 1960) and also in copending U.S. patent application Ser. No. 142,356 filed Oct. 2, 1961, is a device which generates high spectral purity microwave energy as a consequence of quantum resonance transitions of hydrogen atoms between magnetic hyperfine states. The atoms are confined in a storage cell which is lined with a non-relaxing material such as a hydrogen-saturated or halogen-saturated compound, said container being positioned in a mircrowave cavity resonator which is tuned to the hydrogen hyperfine transition frequency of approximately 1420 mc. With such storage cell linings repeated collisions of hydrogen atoms with the cell walls do not appreciably perturb the interaction of atoms with the radiation field in the cavity during the interaction time required for obtaining self-sustaining oscillation (maser action) at the transition frequency. These oscillations excite a resonant mode of the cavity resonator from which energy is extracted via an appropriate microwave coupling.

In order to establish the desired oscillation, an exceedingly long particle-field interaction time, on the order of a second is required. Also the spectral purity of oscillation is greater the longer the interaction time. Prior proposals for increasing the interaction time include making the bulb larger so as to increase the time between wall collisions, and making the entrance to the storage cell small in order to decrease the probability of escape from the cell. These proposals undesirably lead to a more bulky structure and a weakening of the beam flux which enters the storage cell.

A principal object of the present invention is the provision of a novel storage cell construction whereby the interaction time is increased without the necessity of larger bulbs or smaller apertures. Generally speaking, this is accomplished by making the coated surface of the storage cell of a reentrant configuration.

Figure 1:
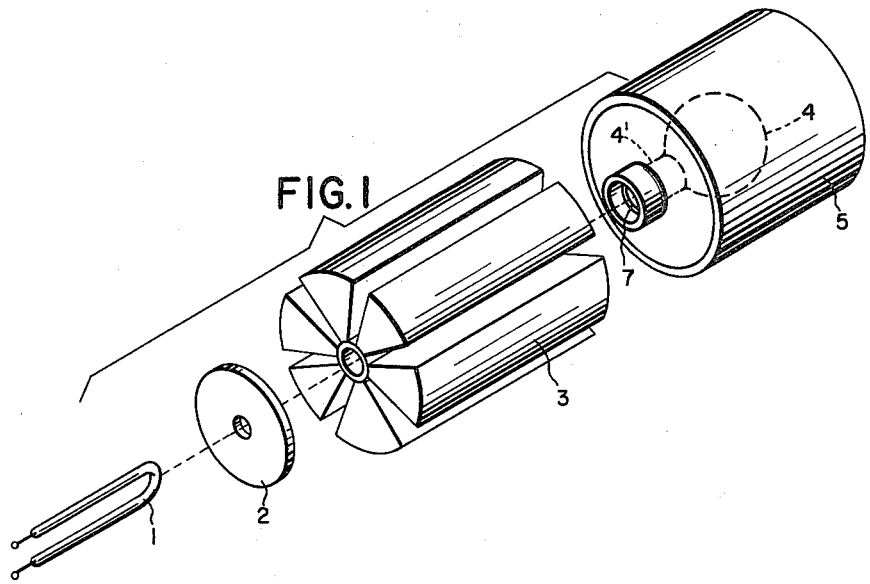
Figure 2:
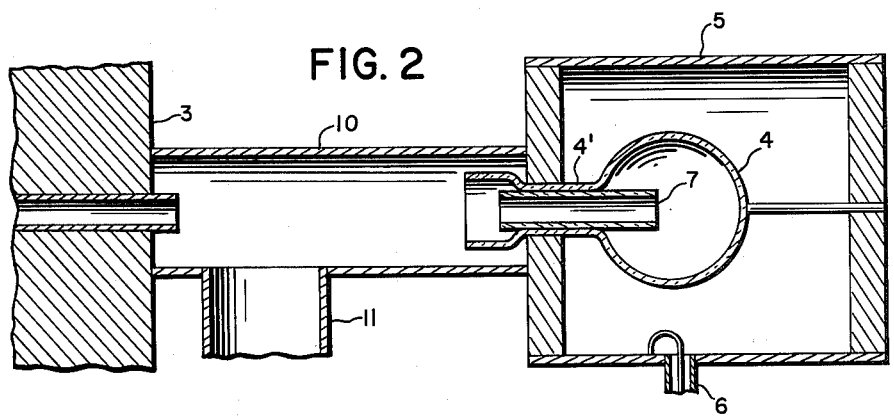

Various features and advantages of the present invention will become apparent after a perusal of the following specification taken in connection with the accompanying drawings wherein, FIG. 1 is a perspective view of the elements of an atomic hydrogen maser in accordance with the present invention, and FIG. 2 is a cross-sectional view of a storage cell construction in accordance with the present invention.

The basic elements of an atomic hydrogen maser are illustrated in FIG. 1. Discharge tube 1 provides a beam of hydrogen atoms which is collimated by an annular stop 2, directed through a hexapole magnet 3, and intercepted by a storage cell 4 positioned in cavity resonator 5. As a result of the selective focusing action of the magnet 3, only hydrogen atoms in the upper $F=1$ hyperfine state enter the structure 4, and the transition of these atoms to the lower $F=0$ hyperfine state results in the desired maser oscillations which are coupled out via coaxial line 6, turned 90° for clarity.

According to the present invention the storage cell has a reentrant tubular portion 7 the inside and outside surfaces of which are of a non-relaxing material of the type used for the main storage cell. Thus, the axially directed beam of atoms is permitted to enter the storage cell 4 through the tube 7, but the randomly directed atoms within the cell are substantially prohibited from leaving whereby the atoms remain for an increased time of interaction with the cavity fields.

Detailed construction of the storage cell is shown in FIG. 2. The main storage cell bulb 4, which is lined with non-relaxing material, has a narrow neck portion 4' into which the reentrant tube 7, which is both lined and coated with non-relaxing material, is seated. One suitable non-relaxing material is Teflon (polytetrafluoroethylene). The bulb 4 is sealed to the usual vacuum housing 10 which is evacuated through port 11.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A particle storage cell comprising a chamber with an entrance tube for receiving a collimated beam of particles directed therethrough, at least a portion of said tube extending reentrantly into said chamber, said chamber being lined with a non-relaxing material, and said tube portion being coated with a non-relaxing material, said non-relaxing materials permitting repeated collisions of particles thereagainst without appreciable perturbation of the interaction of said particles with radiation fields.

2. A storage cell according to claim 1 wherein said particles are hydrogen atoms, said storage cell permitting said atoms to interact with radiation fields therein for a time sufficient to establish self-sustaining oscillation at the magnetic hyperfine resonance frequency of said atoms.

3. An atomic resonance tube apparatus including, means for producing an assemblage of atoms in an elevated energy state, a cavity resonator surrounding said assemblage of atoms for electromagnetic interaction therewith to induce a transition of said atoms from a higher to a lower energy state, means forming a storage cell for containing said assemblage of atoms within said cavity for interaction with the fields thereof, said storage cell comprising a chamber with an exit tube through which the atoms exit said storage cell, at least a portion of said tube extending re-entrantly into said chamber, said chamber being lined with a nonrelaxing material and said tube portion being coated with a nonrelaxing material, said nonrelaxing materials permitting collision of particles thereagainst without appreciable perturbation of the interaction of said particles with the electromagnetic fields of said cavity.

References Cited by the Examiner
UNITED STATES PATENTS
2,424,959   8/47   Alford _____ 331—79 X OTHER REFERENCES
Goldenberg et al.: "Physical Review Letters," Oct. 15, 1960, pp. 361–362, QC1, p. 44.

ROY LAKE, Primary Examiner.
JOHN KOMINSKI, Examiner.